United States Patent
Liu et al.

(10) Patent No.: US 10,946,363 B2
(45) Date of Patent: Mar. 16, 2021

(54) GRAPHENE MODIFIED IRON-BASED CATALYST AND PREPARATION AND APPLICATION THEREOF FOR USE IN FISCHER-TROPSCH REACTION

(71) Applicant: Jiangnan University, Wuxi (CN)

(72) Inventors: Xiaohao Liu, Wuxi (CN); Yuebing Xu, Wuxi (CN); Feng Jiang, Wuxi (CN); Bing Liu, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 0 days.

(21) Appl. No.: 16/546,467

(22) Filed: Aug. 21, 2019

(65) Prior Publication Data

US 2019/0374928 A1 Dec. 12, 2019

Related U.S. Application Data

(63) Continuation of application No. PCT/CN2017/119418, filed on Dec. 28, 2017.

(30) Foreign Application Priority Data

May 2, 2017 (CN) .......................... 201710300472.2

(51) Int. Cl.
*B01J 23/745* (2006.01)
*B01J 37/08* (2006.01)
(Continued)

(52) U.S. Cl.
CPC ............. *B01J 23/745* (2013.01); *B01J 37/08* (2013.01); *B01J 37/343* (2013.01); *C10G 2/332* (2013.01); *C10G 2/344* (2013.01); *B01J 21/18* (2013.01)

(58) Field of Classification Search
CPC ........ B01J 23/745; B01J 37/08; B01J 37/343; B01J 21/18; B01J 23/76; B01J 23/881;
(Continued)

(56) References Cited

U.S. PATENT DOCUMENTS 2,537,699 A * 1/1951 Pierce ................... B01J 23/745
518/717
2013/0085189 A1 4/2013 Jangbarwala
(Continued)

FOREIGN PATENT DOCUMENTS

CN 10 3934040 * 7/2014 .............. B01J 29/74
CN 103934040 A 7/2014
(Continued)

OTHER PUBLICATIONS

Sherif O. Moussa et al., "Graphene-Supported, Iron-Based Nanoparticles for Catalytic Production of Liquid Hydrocarbons from Synthesis Gas: The Role of the Graphene Support in Comparison with Carbon Nanotubes." ACS Catalysis 4, pp. 535-545. (Year: 2014).*
(Continued)

*Primary Examiner* — Patricia L. Hailey
(74) *Attorney, Agent, or Firm* — IPro, PLLC; Na Xu

(57) ABSTRACT

The present disclosure disclosures a graphene modified iron-based catalyst and preparation and application thereof for use in Fischer-Tropsch reaction, belonging to the technical field of catalytic conversion of synthesis gas. The catalyst consists of, by mass percent, 0.01-30% of graphene, 0-20% of promoter and 60-99.99% of iron oxide powder. The preparation process of the catalyst is as follows: the graphene, the iron oxide powder and the promoter are sequentially placed in an aqueous solution for ultrasonic treatment and stirring, and then rotary evaporation, drying and calcining are conducted. The preparation method is simple. The catalyst shows excellent activity in the Fischer-
(Continued)

Tropsch reaction, and maintains a high CO conversion rate of 90% or above for a long time at a very high reaction space velocity; meanwhile, the alkane content in a product is low, and an olefin-alkane ratio can reach 14, thus having an extremely high industrial application value.

10 Claims, 2 Drawing Sheets

(51) Int. Cl.
  *B01J 37/34* (2006.01)
  *C10G 2/00* (2006.01)
  *B01J 21/18* (2006.01)

(58) Field of Classification Search
  CPC .... B01J 2231/648; C10G 2/332; C10G 2/344; C01B 32/182; C01B 32/194
  USPC .......... 502/185, 182, 184, 338; 518/719–721
  See application file for complete search history.

(56) References Cited

U.S. PATENT DOCUMENTS

| | | | | |
|---|---|---|---|---|
| 2013/0116350 | A1* | 5/2013 | Abbaslou | C10G 2/341 518/713 |
| 2013/0211106 | A1* | 8/2013 | El-Shall | B01J 19/126 549/445 |
| 2015/0224484 | A1* | 8/2015 | Kim | C07C 37/002 549/401 |
| 2019/0105638 | A1* | 4/2019 | Lu | B01J 23/892 |
| 2019/0168298 | A1* | 6/2019 | Huang | B22F 9/24 |

FOREIGN PATENT DOCUMENTS

| | | | | |
|---|---|---|---|---|
| CN | 10 4403682 | * | 3/2015 | .............. B01J 23/46 |
| CN | 104403682 | A | 3/2015 | |
| CN | 10 5964263 | * | 9/2016 | .............. B01J 23/78 |
| CN | 105964263 | A | 9/2016 | |
| CN | 10 6391015 | * | 2/2017 | ............ B01J 23/745 |
| CN | 107051461 | A | 8/2017 | |

OTHER PUBLICATIONS

Sergio Navalon et al., "Metal nanoparticles supported on two-dimensional graphenes as heterogeneous catalysts." Coordination Chemistry Reviews 312, pp. 99-148. (Year: 2016).*

Zuojun Wei et al., "Progress on the graphene-involved catalytic hydrogenation reactions." Journal of the Taiwan Institute of Chemical Engineers 67, pp. 126-139. (Year: 2016).*

Zongyuan Wang et al., "Preparation and application of iron oxide/graphene based composites for electrochemical energy storage and energy conversion devices: Current status and perspective." Nano Energy 11, pp. 277-293. (Year: 2015).*

Huabo Zhao et al., "Iron oxide nanoparticles supported on pyrolitic graphene oxide as model catalysts for Fischer Tropsch synthesis." Applied Catalysis A: General 456, pp. 233-239. (Year: 2013).*

Kan Zhang et al., "Inverse opal stuctured a-Fe2O3 on graphene thin films: enhanced photo-assisted water splitting." Nanoscale, 5, pp. 1939-1944. (Year: 2013).*

Yi Cheng et al., "Fischer-Tropsch Synthesis to Lower Olefins over Potassium-Promoted Reduced Graphene Oxide Supported Iron Catalysts." ACS Catalysis 6, pp. 389-399. (Year: 2016).*

* cited by examiner

GRAPHENE MODIFIED IRON-BASED CATALYST AND PREPARATION AND APPLICATION THEREOF FOR USE IN FISCHER-TROPSCH REACTION

TECHNICAL FIELD

The disclosure herein relates to a graphene modified iron-based catalyst and preparation and application thereof for use in Fischer-Tropsch reaction, belonging to the technical field of catalytic conversion of synthesis gas.

BACKGROUND

Lower olefins, including ethylene, propylene and butylene, are important chemical raw materials, which mainly derive from the cracking of naphtha. With the decrease of crude oil resources, the increasingly prominent environmental problems, and the scale development of shale gas, obtaining olefins from petroleum is challenged and becomes unsustainable. Therefore, more and more attention has been paid to the preparation of lower olefins by non-petroleum routes. Direct production of lower olefins from synthesis gas, serving as an alternative technology route for the production of lower olefins such as ethylene and propylene, is of great significance for the utilization of China's abundant coal resources and the alleviation of dependence on petroleum resources. The process does not need to prepare olefins from synthesis gas through methanol or dimethyl ether like an indirect process, so that the process flow is simplified, operation cost is low and investment is greatly reduced.

Direct production of lower olefins from synthesis gas refers to a process in which synthesis gas (CO and $H_2$) is used for producing olefins with the number of carbon atoms less than or equal to 4 through Fischer-Tropsch synthesis under the action of a catalyst. The process produces water and $CO_2$ as by-products. As the distribution of Fischer-Tropsch synthesis products is limited by the Anderson-Schulz-Flory law (the molar distribution of chain growth decreasing exponentially), and the strong exothermicity of the reaction easily leads to the generation of methane and lower alkanes, and promotes the secondary reaction of generated olefins, it is difficult to obtain lower olefins with high selectivity, and the key lies in the development of high-performance catalysts.

Although there are literature reports about using a cobalt-based or ruthenium-based catalyst for Fischer-Tropsch reaction to produce lower olefins, an iron-based catalyst has become the preferred active component for Fischer-Tropsch synthesis to directly produce lower olefins due to the low cost and high lower olefin selectivity. Recently, it is often reported in the literature that carbon materials are used in the preparation of the iron-based catalyst. The carbon materials can not only provide the required stability, but also facilitate the reduction and activation of iron species. Therefore, the carbon materials have become a research hotspot in recent years whether as supports or promoters. Graphene, as a new type of carbon material, has the advantages of large specific surface area, unique two-dimensional structure, excellent electrical and thermal conductivity, and easy chemical modification, and is considered to be an ideal catalyst support or promoter. However, in most of the current researches, graphene is added to an iron-based catalyst precursor, the preparation process is complex, and the improvement in catalytic performance and stability is not quite significant. Therefore, it is necessary to develop a method which can directly modify the iron-based catalyst with graphene, so as to simplify the preparation process of the catalyst, and improve the activity of the catalyst, lower olefin selectivity and stability at the same time.

SUMMARY

The present disclosure relates to a graphene modified iron-based catalyst capable of realizing the preparation of lower olefins with high selectivity from synthesis gas, and capable of preparing higher α-olefin with high activity, good stability and a simple preparation method, as well as a preparation method thereof.

The catalyst according to the present disclosure is a graphene modified iron-based catalyst, and application of the graphene modified iron-based catalyst in Fischer-Tropsch reaction is also provided.

The graphene modified iron-based catalyst includes, in parts by mass, 0.01-30 parts of graphene, 0-20 parts of promoter and 60-99.99 parts of iron oxide powder.

In one embodiment of the present disclosure, the iron oxide is one or any combination of ferroferric oxide, ferric oxide and ferrous oxide, and a particle size of the iron oxide is 50-1000 nm, preferably 100-500 nm.

In one embodiment of the present disclosure, the promoter is one or any combination of K, Na, Mn, Cu, Zn, Mo, Co and S.

The present disclosure further provides a method for preparing the graphene modified iron-based catalyst, including the following steps:

(1) dispersing the graphene in an aqueous solution at 10-80° C. to form a suspension, ultrasonically dispersing for 0.5-5 h, and then stirring for 1-24 h;

(2) adding the iron oxide into the suspension formed in the step (1) according to a stoichiometric ratio, and continuously stirring for 0.5-24 h;

(3) adding an promoter precursor into the suspension formed in the step (2) according to a stoichiometric ratio, and continuously stirring for 1-24 h; and (4) conducting rotary evaporation on a solution obtained in the step (3) to dryness, drying an obtained solid at 80-120° C. for 1-24 h, and then calcining in a gas of nitrogen, helium or argon at 250-800° C. for 1-24 h to obtain the graphene modified iron-based catalyst; and when the content of the promoter is 0 part, the step (3) is omitted.

In one embodiment of the present disclosure, the promoter precursor is selected from soluble compounds containing promoter elements, and preferably is one or more of nitrate, carbonate, acetate, molybdate and sulfide.

The present disclosure further provides a method for preparing synthesis gas from the prepared graphene modified iron-based catalyst, the catalyst is pre-reduced with $H_2$ for a certain period of time before reaction, and then the catalyst is cooled to a reaction temperature for catalytic reaction.

In one embodiment of the present disclosure, the graphene modified iron-based catalyst is pressed at a pressure of 5.5 MPa, crushed, sieved through a 40-60 mesh sieve and then used for the Fischer-Tropsch reaction.

In one embodiment of the present disclosure, the graphene modified iron-based catalyst is placed in a continuous flow reactor to catalyze continuous reaction.

Compared with the prior art, the present disclosure has the following advantages that:

(1) the prepared catalyst has a simple preparation method and is prepared with only a few steps; a small sized iron carbide active phase which can be effectively formed in the reaction process maintains a high activity; especially in the Fischer-Tropsch reaction, an excellent activity is shown, and a high CO conversion rate of 90% or above is maintained for a long time at a very high reaction space velocity; meanwhile, the alkane content in a product is low, and an olefin-alkane ratio can reach 14, thus having an extremely high industrial application value; and (2) the prepared catalyst has extremely high total olefin selectivity and low methane selectivity; the activity of the catalyst is extremely high, and the stability of the catalyst can be maintained at an extremely high space velocity.

DETAILED DESCRIPTION

Definition and calculation formula of conversion rate:

$$X_{CO}\ (\%) = \frac{[CO]_{in} - [CO]_{out}}{[CO]_{in}} \times 100\%,$$

wherein $[CO]_{in}$ represents the molar concentration of CO in inlet gas of a reactor, and $[CO]_{out}$ represents the molar concentration of CO in outlet gas of the reactor.

Definition and calculation formula of selectivity:

$$S_{CH4}\ (\%) = \frac{[CH_4]_{out}}{[CO]_{in} - [CO]_{out}} \times 100\%,$$

wherein $[CO]_{out}$ represents the molar concentration of $CO_2$ in the outlet gas of the reactor, and $[CH_4]_{out}$ represents the molar concentration of $CH_4$ in the outlet gas of the reactor.

Selectivity $S_{Cn}$ of hydrocarbons with a carbon number of n in products, and selectivity $S_{Cn-n+k}$ of hydrocarbons with carbon numbers ranging from n to n+k in the products:

$$S_{Cn}\ (\%) = \frac{[Cn]_{out}}{[CH_4]_{out}} \times S_{CH4},$$

$$S_{Cn-n+k}\ (\%) = \sum_{i=n}^{i=n+k} S_{Ci},$$

wherein $[Cn]_{out}$ represents the molar concentration of hydrocarbons with a carbon number of n in the outlet gas of the reactor.

Examples 1-4 Preparation of Graphene Modified Iron-Based Catalyst

Example 1

Figure 1:
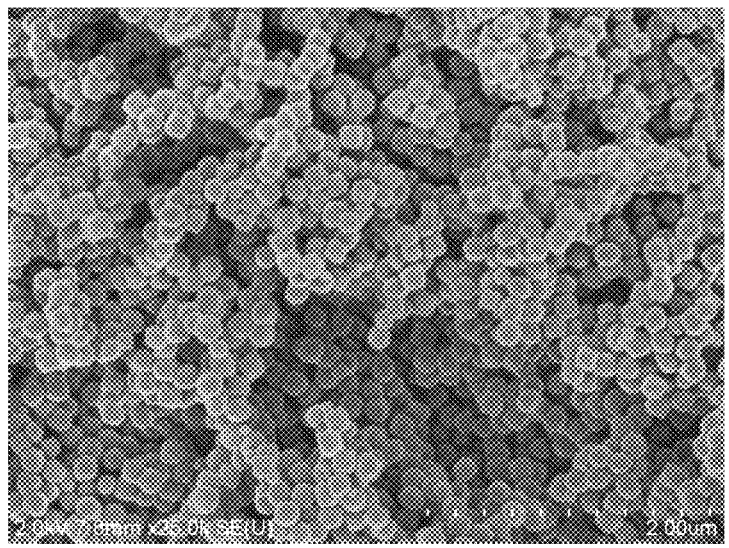
FIG. 1 is an SEM image of ferric oxide powder in Examples 1 and 2.

0.677 g graphene oxide and 3.112 g ferric oxide powder were respectively taken, dispersed in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst A with a graphene content of 17.8% and a ferric oxide content of 82.2%, wherein the average particle diameter of ferric oxide in the catalyst was 120 nm, as shown in FIG. 1.

Example 2

0.325 g graphene oxide, 2.876 g ferric oxide powder and 0.0715 g potassium carbonate were respectively taken, dispersed and dissolved in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst B with a graphene content of 10%, a ferric oxide content of 88.5%, and a potassium oxide content of 1.5%, wherein the average particle diameter of ferric oxide in the catalyst was 120 nm, as shown in FIG. 1.

Example 3

Figure 2:
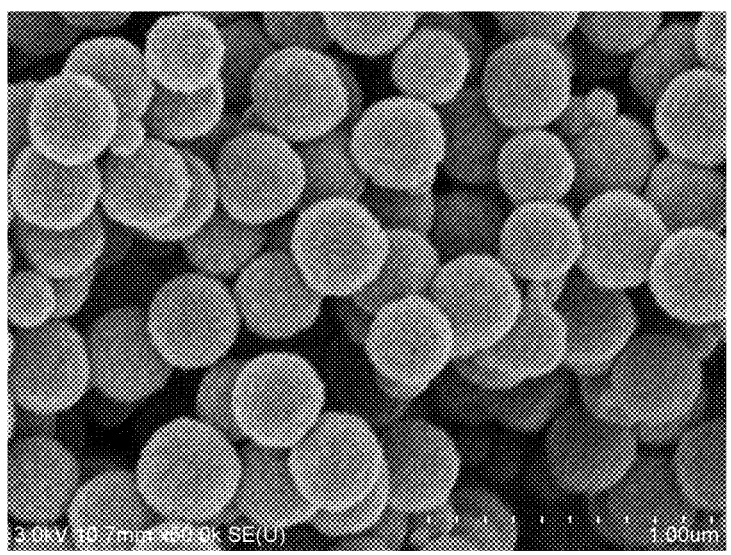
FIG. 2 is an SEM image of ferroferric oxide powder in Examples 3 and 4.

0.551 g graphene oxide and 4.052 g ferroferric oxide powder were respectively taken, dispersed in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst C with a graphene content of 12% and a ferroferric oxide content of 88%, wherein the average particle diameter of ferroferric oxide in the catalyst was 290 nm, as shown in FIG. 2.

Example 4

0.861 g graphene oxide, 4.001 g ferroferric oxide powder, and 0.435 g potassium nitrate were respectively taken, dispersed and dissolved in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst D with a graphene content of 17%, a ferroferric oxide content of 79%, and a potassium oxide content of 4%, wherein the average particle diameter of ferroferric oxide in the catalyst was 290 nm, as shown in FIG. 2.

Example 5

Figure 3:
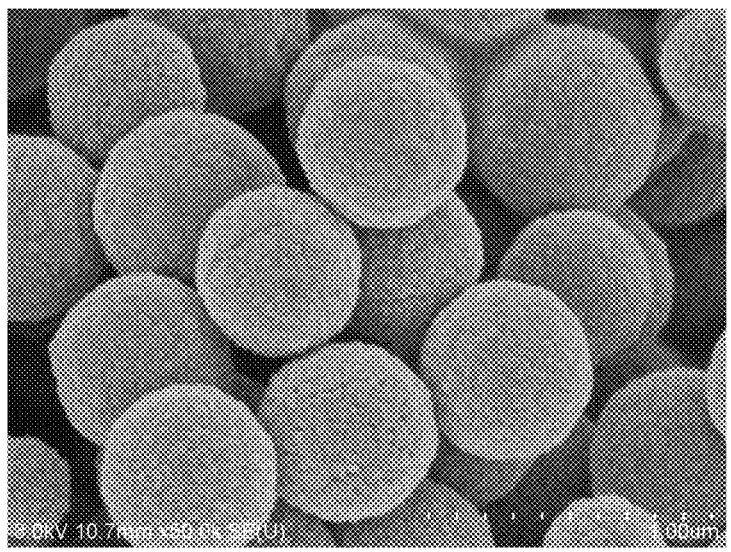
FIG. 3 is an SEM image of ferroferric oxide powder in Example 5.

0.861 g graphene oxide, 4.001 g ferroferric oxide powder, and 0.435 g potassium nitrate were respectively taken, dispersed and dissolved in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst G with a graphene content of 17%, a ferroferric oxide content of 79%, and a potassium oxide content of 4%, wherein the average particle diameter of ferroferric oxide in the catalyst was 610 nm, as shown in FIG. 3.

Example 6

0.677 g graphene oxide and 3.112 g ferric oxide powder were respectively taken, dispersed in an aqueous solution at 40° C. in sequence, and continuously stirred for 5 h; then rotary evaporation to dryness at 85° C. and dry at 120° C. for 12 h were conducted; and then calcined at 600° C. for 3 h in a nitrogen atmosphere to obtain a catalyst H with a graphene content of 17.8% and a ferric oxide content of 82.2%, wherein the average particle diameter of ferric oxide in the catalyst was 120 nm.

Examples 7-10 Application of Graphene Modified Iron-Based Catalyst in Synthesis Gas Conversion A prepared catalyst was pressed at a pressure of 5.5 MPa, crushed and sieved to obtain a 40-60 mesh sample; and 0.15 g catalyst was taken and placed in a continuous flow reactor, the catalyst was pre-reduced with $H_2$ for a certain period of time before reaction, and then cooled to a reaction temperature to perform continuous reaction. The reaction gas was composed of 47.5 vol % CO, 47.5 vol % $H_2$ and 5 vol % Ar, wherein Ar was used as the internal standard gas to calculate the conversion rate of CO. The products were analyzed on-line at atmospheric pressure after being cooled in a cold trap by a gas chromatography equipped with TCD and FID detectors.

Example 7

The catalysts A, G and H were placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and reaction temperatures of 300° C., 320° C. and 340° C., so as to investigate the influence of the reaction temperatures. The results of the conversion rate of CO and olefin selectivity are shown in Table 1.

Example 8

The catalyst B was placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction temperature of 300° C., and reaction space velocities of 10000 $h^{-1}$, 20000 $h^{-1}$ and 40000 $h^{-1}$, so as to investigate the influence of the reaction space velocities. The results of the conversion rate of CO and olefin selectivity are shown in Table 1.

Example 9

The catalyst C was placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and a reaction temperature of 340° C. The results of the conversion rate of CO and olefin selectivity are shown in Table 1.

Example 10

The catalyst D was placed in a pressurized fixed bed reactor, a fluidized bed reactor and a slurry bed reactor respectively, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and a reaction temperature of 340° C. The results of the conversion rate of CO and olefin selectivity are shown in Table 1. This result was used to compare the reaction results of the catalyst in different reactors.

Comparative Example 1

3.88 g ferric oxide powder and 0.176 g potassium carbonate were respectively taken, dispersed and dissolved in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst E with a ferric oxide content of 97% and a potassium oxide content of 3%, wherein the average particle diameter of ferric oxide in the catalyst was 120 nm, as shown in FIG. 1. The catalyst was placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and reaction temperatures of 300° C. and 340° C., so as to investigate the influence of the reaction temperatures. The results of the conversion rate of CO and olefin selectivity are shown in Table 2.

Comparative Example 2

0.506 g activated carbon, 4.948 ferroferric oxide powder and 0.248 g potassium carbonate were respectively taken, dispersed and dissolved in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst F with an activated carbon content of 9%, a ferroferric oxide content of 89% and a potassium oxide content of 3%, wherein the average particle diameter of ferroferric oxide in the catalyst was 290 nm, as shown in FIG. 2. The catalyst was placed in a pressurized fixed bed reactor and a fluidized bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and a reaction temperature of 340° C. The results of the conversion rate of CO and olefin selectivity are shown in Table 2.

Comparative Example 3

0.677 g graphene oxide and 15.716 g iron nitrate nonahydrate were respectively taken, dispersed in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst I with a graphene content of 17.8% and a ferric oxide content of 82.2%. The catalyst was placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and a reaction temperature of 340° C. The results of the conversion rate of CO and olefin selectivity are shown in Table 2.

Comparative Example 4

2.568 g graphene oxide and 3.112 g ferric oxide powder were respectively taken, dispersed in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst J with a graphene content of 45.2% and a ferric oxide content of 54.8%, wherein the average particle diameter of ferric oxide in the catalyst was 120 nm, the same as that in Example 1. The catalyst was placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and a reaction temperature of 340° C. The results of the conversion rate of CO and olefin selectivity are shown in Table 2.

Comparative Example 5

0.677 g graphene oxide and 3.112 g ferric oxide powder were respectively taken, dispersed in an aqueous solution at 40° C. in sequence, and continuously stirred for 12 h; then rotary evaporation to dryness at 85° C. and dry at 105° C. for 24 h were conducted; and then calcined at 400° C. for 5 h in a nitrogen atmosphere to obtain a catalyst K with a graphene content of 17.8% and a ferric oxide content of 82.2%, wherein the average particle diameter of ferric oxide in the catalyst was 10 nm. The catalyst was placed in a pressurized fixed bed reactor, heated to 380° C. at a rate of 5° C./min in an $H_2$ atmosphere, and reduced for 10 h at atmospheric pressure and a space velocity of 1000 $h^{-1}$; and then the temperature was reduced, and reaction gases were introduced for reaction at a reaction pressure of 1.0 MPa, a reaction space velocity of 20000 $h^{-1}$, and a reaction temperature of 340° C. The results of the conversion rate of CO and olefin selectivity are shown in Table 2.

TABLE 1

Reaction Performance of Different Catalysts in Preparing Lower Olefins through Synthesis Gas Conversion

| Catalyst | Reaction temperature (° C.) | Reaction space velocity ($h^{-1}$) | Conversion rate of CO (%) | Hydrocarbon product distribution (C-mol %) | | | Olefin-alkane ratio (O/P) |
|---|---|---|---|---|---|---|---|
| | | | | $CH_4$ | $C_{2+}^=$ | $C_{2+}^0$ | |
| A | 300 | 20000 | 65.2 | 9.7 | 83.4 | 6.9 | 12.1 |
| A | 320 | 20000 | 78.5 | 11.2 | 81.0 | 7.8 | 10.4 |
| A | 340 | 20000 | 90.2 | 13.8 | 79.0 | 7.2 | 10.9 |
| B | 320 | 10000 | 85.1 | 12.1 | 81.9 | 6.0 | 13.6 |
| B | 320 | 20000 | 79.2 | 11.2 | 82.7 | 6.1 | 13.5 |
| B | 320 | 40000 | 70.4 | 11.7 | 82.0 | 6.3 | 13.0 |
| C | 340 | 20000 | 92.1 | 14.2 | 80.0 | 5.8 | 13.7 |
| D | 340 | 20000 | 93.2 | 12.7 | 80.8 | 6.5 | 12.4 |
| D* | 340 | 20000 | 92.9 | 10.5 | 83.5 | 6.0 | 14.0 |
| D** | 340 | 20000 | 90.8 | 9.8 | 83.7 | 6.5 | 12.9 |
| G | 340 | 20000 | 80.3 | 11.8 | 76.6 | 11.6 | 6.6 |
| H | 340 | 20000 | 87.5 | 11.6 | 82.4 | 6.0 | 13.7 |

Reaction conditions: fixed bed reactor, 1.0 MPa, average data within 100-500 h of reaction.
*Fluidized bed reactor;
**Slurry bed reactor

TABLE 2

Experimental Results of Comparative Examples

| Catalyst | Reaction temperature (° C.) | Reaction space velocity ($h^{-1}$) | Conversion rate of CO (%) | Hydrocarbon product distribution (C-mol %) | | | Olefin alkane ratio (O/P) |
|---|---|---|---|---|---|---|---|
| | | | | $CH_4$ | $C_{2+}^=$ | $C_{2+}^0$ | |
| E | 300 | 20000 | 12.3 | 34.5 | 24.6 | 40.9 | 0.6 |
| E | 340 | 20000 | 5.6 | 41.2 | 19.6 | 39.2 | 0.5 |
| F | 320 | 20000 | 8.9 | 37.7 | 25.7 | 36.6 | 0.7 |
| F* | 320 | 20000 | 11.1 | 32.9 | 25.2 | 41.9 | 0.6 |
| I | 340 | 20000 | 20.6 | 40.5 | 20.7 | 38.8 | 0.5 |
| J | 340 | 20000 | 1.2 | 60.7 | 6.8 | 32.5 | 0.2 |
| K | 340 | 20000 | 89.6 | 20.5 | 14.3 | 65.2 | 0.2 |

Reaction conditions: fixed bed reactor, 1.0 MPa, average data within 5-10 h.
*Fluidized bed reactor Comparing the experimental results in Table 1 and Table 2, it can be clearly seen that the graphene modified iron-based catalyst exhibits excellent catalytic performance, maintains a stable activity within 500 h of reaction, and still exhibits a very high CO conversion rate at a very high reaction space velocity. Even in the absence of promoter, olefin selectivity in the products is close to 50%, and olefin-alkane ratio can reach 13. However, iron-based catalysts without graphene modification or modified with other carbon materials quickly lose the activity within a few hours of reaction, and the products are mainly alkanes. The results show that the graphene modified iron-based catalyst has an excellent industrial application value.

Although the present disclosure has been disclosed in terms of preferred examples, the preferred examples are not intended to limit the present disclosure. Any person familiar with this technology can make various changes and modifications without departing from the spirit and scope of the present disclosure. Therefore, the scope of protection of the present disclosure should be as defined in the claims.

What is claimed is:

1. A method for preparing a graphene modified iron-based catalyst, wherein raw materials comprise 0.01-30 parts by mass of graphene, 0-20 parts by mass of promoter and 60-99.99 parts by mass of iron oxide,
the method comprising the following steps:
(1) dispersing the graphene in an aqueous solution at 10-80° C. to form a suspension, ultrasonically dispersing for 0.5-5 h, and then stirring for 1-24 h;
(2) adding the iron oxide into the suspension formed in the step (1) according to a stoichiometric ratio, and continuously stirring for 0.5-24 h;
(3) adding a precursor of the promoter into the suspension formed in the step (2) according to a stoichiometric ratio, and continuously stirring for 1-24 h; and
(4) conducting rotary evaporation on a solution obtained in the step (3) to dryness, drying an obtained solid at 80-120° C. for 1-24 h, and then calcining in a gas of nitrogen, helium or argon at 250-800° C. for 1-24 h to obtain the graphene modified iron-based catalyst, and
wherein when the promoter is 0 part by mass, the step (3) is omitted;
wherein the iron oxide is one selected from a group consisting of ferroferric oxide, ferric oxide, ferrous oxide, and any combination thereof; and the iron oxide has a particle size of 50-1000 nm.

2. The method according to claim 1, wherein the precursor is selected from soluble compounds containing promoter elements.

3. The method according to claim 2, wherein the precursor is one selected from a group consisting of nitrate, carbonate, acetate, molybdate, sulfide, and any combination thereof.

4. The method according to claim 3, wherein the promoter is one selected from a group consisting of K, Na, Mn, Cu, Zn, Mo, Co and S, and any combination thereof.

5. The method according to claim 1, wherein the particle size is 100-500 nm.

6. The method according to claim 1, wherein the promoter is one selected from a group consisting of K, Na, Mn, Cu, Zn, Mo, Co, S, and any combination thereof.

7. A graphene modified iron-based catalyst prepared by the method according to claim 1.

8. A method of conducting Fischer-Tropsch reaction by using the graphene modified iron-based catalyst according to claim 7, comprising applying the catalyst to catalyze the Fischer-Tropsch reaction of synthesis gas, wherein the catalyst is pre-reduced with H2 for a certain period of time before the reaction, and then the catalyst is cooled to a reaction temperature to perform catalytic reaction.

9. The method according to claim 8, wherein the catalyst is placed in a continuous flow reactor to catalyze continuous reaction.

10. The method according to claim 1, further comprising pressing the catalyst at a pressure of 5.5 MPa, crushing the catalyst, and sieving the catalyst through a 40-60 mesh sieve.

* * * * *